(12) United States Patent
Masuda

(10) Patent No.: US 10,308,126 B2
(45) Date of Patent: Jun. 4, 2019

(54) CHARGING APPARATUS AND CONTROL METHOD FOR CHARGING APPARATUS

(71) Applicant: Toyota Jidosha Kabushiki Kaisha, Toyota-shi, Aichi-ken (JP)

(72) Inventor: Tomokazu Masuda, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/677,094

(22) Filed: Aug. 15, 2017

(65) Prior Publication Data

US 2018/0072176 A1 Mar. 15, 2018

(30) Foreign Application Priority Data

Sep. 14, 2016 (JP) ................................. 2016-179526

(51) Int. Cl.
*H02J 7/00* (2006.01)
*H02J 7/04* (2006.01)
*B60L 11/18* (2006.01)
*B60L 53/14* (2019.01)
*B60L 53/60* (2019.01)

(52) U.S. Cl.
CPC .......... *B60L 11/1838* (2013.01); *B60L 53/14* (2019.02); *B60L 53/60* (2019.02); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01)

(58) Field of Classification Search
USPC .......................... 320/109, 108, 107, 104, 137
See application file for complete search history.

(56) References Cited

U.S. PATENT DOCUMENTS

| 8,618,767 | B2 * | 12/2013 | Ishii ...................... B60L 3/0069 320/104 |
| 2010/0289516 | A1 * | 11/2010 | Mitsutani ................. B60L 3/00 324/764.01 |
| 2010/0299008 | A1 * | 11/2010 | Mitsutani ............... B60K 6/445 701/22 |
| 2015/0032315 | A1 * | 1/2015 | Kinomura ............. B60L 3/0069 701/22 |
| 2015/0210172 | A1 * | 7/2015 | Kanayama .......... B60L 11/1809 320/109 |
| 2016/0152154 | A1 * | 6/2016 | Mizuno ................. B60L 3/0069 307/10.1 |
| 2016/0368391 | A1 * | 12/2016 | Kojima ................. B60L 3/0069 |

FOREIGN PATENT DOCUMENTS

JP 2013-038996 A 2/2013

* cited by examiner

*Primary Examiner* — Alexis B Pacheco
(74) *Attorney, Agent, or Firm* — Dinsmore & Shohl LLP

(57) ABSTRACT

In a case where a connector of a power supply facility is connected to an inlet, an ECU is configured to control a potential of a pilot signal so as to request power supply to the power supply facility and to permit execution of external charging. Further, in a case where the ECU detects a feeding voltage from the power supply facility without requesting the power supply to the power supply facility, when it is detected that the feeding voltage is not output from the power supply facility in a state where the connector is connected to the inlet, the ECU permits the external charging.

5 Claims, 12 Drawing Sheets

CHARGING APPARATUS AND CONTROL METHOD FOR CHARGING APPARATUS

CROSS-REFERENCE TO RELATED APPLICATIONS

This application claims priority to Japanese Patent Application No. 2016-179526 filed on Sep. 14, 2016, incorporated herein by reference in its entirety.

BACKGROUND

1. Technical Field

The present disclosure relates to a charging apparatus and a control method thereof, and particularly, to a charging apparatus for charging a power storage device provided in a vehicle upon receipt of an electric power supplied through a charger cable from a power supply facility provided outside the vehicle, and a control method thereof.

2. Description of Related Art

Japanese Patent Application Publication No. 2013-38996 (JP 2013-38996 A) discloses a charging apparatus for a vehicle, the charging apparatus being configured to charge a power storage device provided in the vehicle upon receipt of an electric power supplied through a charger cable from a power supply facility (a charging station) outside the vehicle (hereinafter, the charging of the power storage device by the power supply facility provided outside the vehicle is referred to as "external charging").

The charging apparatus for the vehicle is provided in the vehicle, and requests power supply (external charging) to the power supply facility by use of a pilot signal (a CPLT signal) transmitted between the charging apparatus and the power supply facility through the charger cable. More specifically, the control means of the charging apparatus for the vehicle changes a potential of the pilot signal, so as to request power supply to the power supply facility (see JP 2013-38996 A).

In the charging apparatus for the vehicle, the power supply is requested to the power supply facility (the charging station) from the charging apparatus by controlling the potential of the pilot signal in the charging apparatus (the vehicle), and the power supply from the power supply facility to the charging apparatus (the vehicle) is started in response to the power supply request.

SUMMARY

However, there is such a power supply facility in which the power supply is started without being based on a power supply request from the charging apparatus due to a specification of the power supply facility. In a case of such a power supply facility, the charging apparatus for the vehicle configured to receive power supply from the power supply facility based on a power supply request might prohibit external charging because it is uncertain whether the power supply facility is normal (the specification of the power supply facility) or not, and the power supply facility might be abnormal. Even in the case of such a power supply facility, if the power supply facility is normal, it is desirable to permit the external charging.

The present disclosure provides a charging apparatus that allows external charging even from a power supply facility that starts power supply without being based on a power supply request from the charging apparatus, and a control method thereof.

A charging apparatus of this disclosure is a charging apparatus for charging a power storage device provided in a vehicle upon receipt of an electric power supplied through a charger cable from a power supply facility provided outside the vehicle, and includes an inlet and an electronic control unit. The inlet is configured to be connectable to a connector provided in the charger cable. The electronic control unit is configured to control a potential of a pilot signal (a pilot signal CPLT) received through the charger cable from the power supply facility when the connector is connected to the inlet, so as to request power supply to the power supply facility and to permit charging of the power storage device. When the electronic control unit detects an output start of a feeding voltage from the power supply facility without requesting the power supply to the power supply facility and the electronic control unit detects that the feeding voltage is not output from the power supply facility in a state where the connector is connected to the inlet, the electronic control unit is configured to permit the charging of the power storage device.

Further, a control method of this disclosure is a control method for a charging apparatus for charging a power storage device provided in a vehicle upon receipt of an electric power supplied through a charger cable from a power supply facility provided outside the vehicle. The charging apparatus includes an inlet configured to be connectable to a connector provided in the charger cable, and an electronic control unit. Further, the control method includes: requesting power supply to the power supply facility and permitting charging of the power storage device by controlling a potential of a pilot signal (a pilot signal CPLT) received through the charger cable from the power supply facility when the connector is connected to the inlet; and permitting the charging of the power storage device when an output start of a feeding voltage from the power supply facility is detected without requesting the power supply to the power supply facility and the electronic control unit detects that the feeding voltage is not output from the power supply facility in a state where the connector is connected to the inlet.

In the charging apparatus and the control method, when the output start of the feeding voltage from the power supply facility is detected without requesting the power supply to the power supply facility and it is detected that the feeding voltage is not output from the power supply facility in the state where the connector is connected to the inlet, it is determined that the power supply facility operates normally in such a manner that the power supply and its stop are performable, so that external charging is permitted. Accordingly, with the charging apparatus and the control method, it is possible to execute the external charging from the power supply facility that starts power supply without being based on the power supply request from the charging apparatus.

When the electronic control unit detects the output start of the feeding voltage from the power supply facility without requesting the power supply to the power supply facility and the electronic control unit does not detect that the feeding voltage is not output from the power supply facility in the state where the connector is connected to the inlet, the electronic control unit may be configured to prohibit the charging of the power storage device.

When it is not detected that the feeding voltage is not output from the power supply facility in the state where the connector is connected to the inlet, the power supply facility might have such an abnormality that a relay provided in a power supply path, for example, is stuck closed, and therefore, external charging is prohibited. Accordingly, with the charging apparatus, it is possible to prohibit the external charging in a case where the power supply is performed without being based on the power supply request from the charging apparatus due to the abnormality of the power supply facility.

When the electronic control unit detects the output start of the feeding voltage from the power supply facility without requesting the power supply to the power supply facility, the electronic control unit may be configured to control the potential of the pilot signal so as to request a power supply stop to the power supply facility. When the power supply from the power supply facility is stopped in response to the request of the power supply stop, the electronic control unit may be configured to permit the charging of the power storage device.

With the charging apparatus, it is possible to determine whether or not the power supply facility operates normally in conjunction with the control of the potential of the pilot signal by the electronic control unit.

When the feeding voltage is not output from the power supply facility in the state where the connector is connected to the inlet, the electronic control unit may be configured to leave a history indicating that the feeding voltage is not output from the power supply facility. When the electronic control unit detects the output start of the feeding voltage from the power supply facility without requesting the power supply to the power supply facility and the history exists, the electronic control unit may be configured to permit the charging of the power storage device.

With the charging apparatus, it is possible to determine whether or not the power supply facility operates normally, without controlling the potential of the pilot signal by the electronic control unit.

With this disclosure, it is possible to execute external charging from a power supply facility that starts power supply without being based on a power supply request from a charging apparatus.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
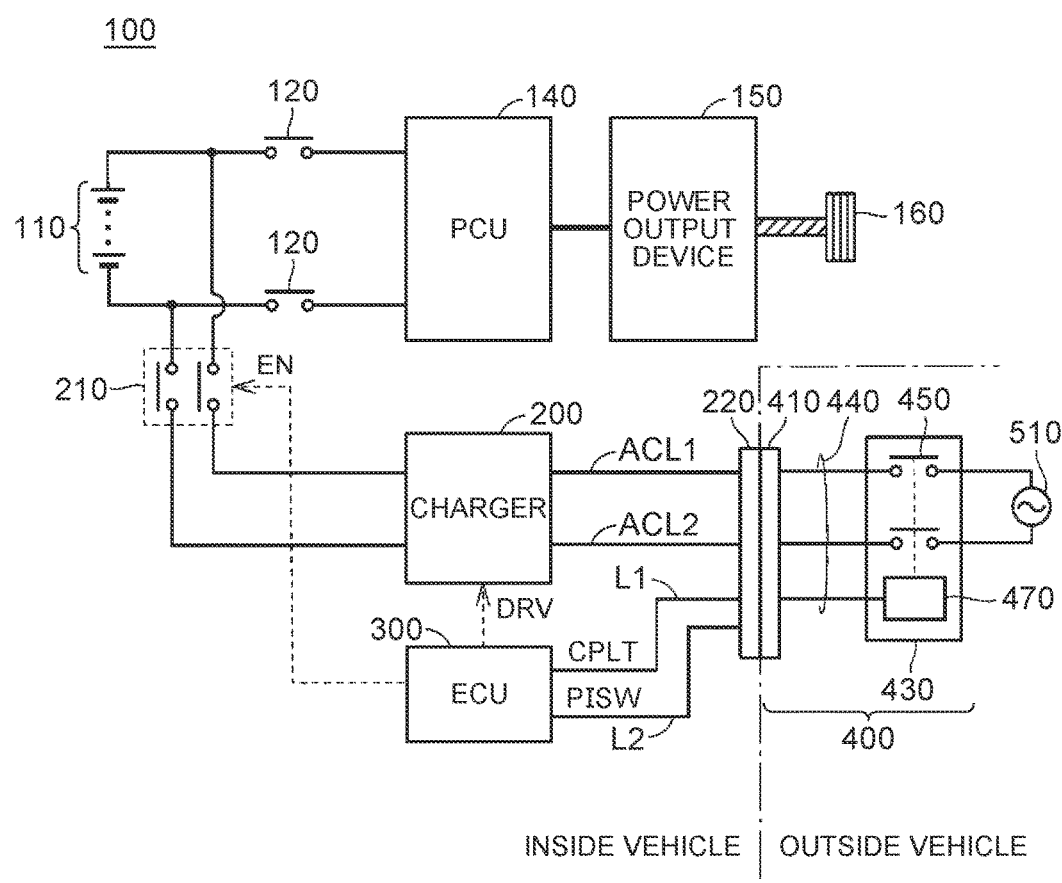
FIG. 1 is a schematic configuration diagram of a vehicle to which a charging apparatus of Embodiment 1 is applied.

The following describes embodiments of the present disclosure in detail with reference to the drawings. Note that the same or equivalent portions in the drawings have the same reference sign and descriptions thereof are not repeated.

FIG. 1 is a schematic configuration diagram of a vehicle 100 to which a charging apparatus of Embodiment 1 of the present disclosure is applied. With reference to FIG. 1, the vehicle 100 includes a power storage device 110, a system main relay (hereinafter also referred to as the "SMR (System Main Relay)") 120, a power control unit (hereinafter also referred to as the "PCU (Power Control Unit)") 140, a power output device 150, and a driving wheel 160. Further, the vehicle 100 also includes a charger 200, a charging relay 210, an inlet 220, and an electronic control unit (hereinafter also referred to as the "ECU (Electronic Control Unit)") 300.

The power storage device 110 is a direct-current power supply that is rechargeable, and is constituted by a secondary battery such as a lithium-ion battery or a nickel hydrogen battery, for example. The power storage device 110 is charged by receiving an electric power generated by the power output device 150, and is also charged by receiving an electric power supplied from a power supply facility provided outside the vehicle 100 at the time of external charging. An electric double layer capacitor or the like can be employed as the power storage device 110. The SMR 120 is a relay provided between the power storage device 110 and the PCU 140 and configured to perform electrical connection/disconnection between the power storage device 110 and the PCU 140.

The PCU 140 generally indicates a power converter configured to drive the power output device 150 by receiving an electric power from the power storage device 110. For example, the PCU 140 is configured to include an inverter for driving a motor included in the power output device 150, a converter that boosts a direct voltage supplied to the inverter to a voltage of the power storage device 110 or more, and so on. The power output device 150 generally illustrates a device that outputs power to drive the driving wheel 160. For example, the power output device 150 is configured to include a motor that drives the driving wheel 160, and so on.

The inlet 220 is configured to be connectable to a connector of a charger cable of the power supply facility provided outside the vehicle 100. In FIG. 1, the inlet 220 is connected to a connector 410 provided in a charger cable 440 of a power supply facility 400. During external charging by the power supply facility, the inlet 220 receives an electric power supplied through the charger cable of the power supply facility, and outputs the electric power thus received to the charger 200.

Signal wires L1, L2 are provided between the inlet 220 and the ECU 300. The signal wire L1 is a signal wire for transmitting a pilot signal CPLT for exchanging predetermined information between the vehicle 100 and a power supply facility connected to the inlet 220. The signal wire L2 is a signal wire for transmitting a connector connect signal PISW indicative of a connection state between the inlet 220 and a connector of the power supply facility. The pilot signal CPLT and the connector connect signal PISW will be described later.

The charger 200 is electrically connected to the power storage device 110 via the charging relay 210. The charger 200 converts an electric power input into the inlet 220 to an electric power having a charging voltage for the power storage device 110 in accordance with a command from the ECU 300. The electric power thus converted by the charger 200 is supplied to the power storage device 110 via the charging relay 210, so that the power storage device 110 is charged. The charging relay 210 is provided between the charger 200 and the power storage device 110, and performs electrical connection/disconnection between the charger 200 and the power storage device 110 based on a signal EN from the ECU 300.

The ECU 300 includes a CPU (Central Processing Unit), a ROM (Read Only Memory) in which a process program and the like are stored, a RAM (Random Access Memory) in which data and the like are temporarily stored, input/output ports for inputting/outputting various signals, and so on (not shown). The ECU 300 executes a predetermined computing process by a software process by the CPU executing a program stored in the ROM, and/or a hardware process by an exclusive electronic circuit.

FIG. 1 illustrates an example in which the inlet 220 of the vehicle 100 is connected to the connector 410 of the power supply facility 400, and an electric power is supplied from the power supply facility 400 to the vehicle 100. The power supply facility 400 includes the connector 410, an EVSE (Electric Vehicle Supply Equipment) 430, and a charger cable 440.

The EVSE 430 is connected to a power supply 510. The power supply 510 is a commercial power supply, for example. The EVSE 430 is provided in a charging station, but may be provided in the middle of the charger cable 440. The EVSE 430 controls supply/cutoff of an electric power from the power supply 510 to the vehicle 100 through the charger cable 440. The EVSE 430 satisfies a requirement specification of "SAEJ1772" (SAE Electric Vehicle Conductive Charge Coupler) of the United States of America, for example.

The EVSE 430 includes a CCID (Charging Circuit Interrupt Device) 450, and a CPLT control circuit 470. The CCID 450 is a relay provided in a power supply path from the power supply 510 to the vehicle 100 and is controlled by the CPLT control circuit 470.

The CPLT control circuit 470 generates a pilot signal CPLT to be transmitted to the ECU 300 of the vehicle 100, and outputs it to the ECU 300 through an exclusive signal wire included in the charger cable 440. A potential of the pilot signal CPLT is controlled in the ECU 300, so that the CPLT control circuit 470 controls the CCID 450 based on the potential of the pilot signal CPLT. That is, by controlling the potential of the pilot signal CPLT in the ECU 300, the CCID 450 can be remotely controlled from the ECU 300.

Figure 2:
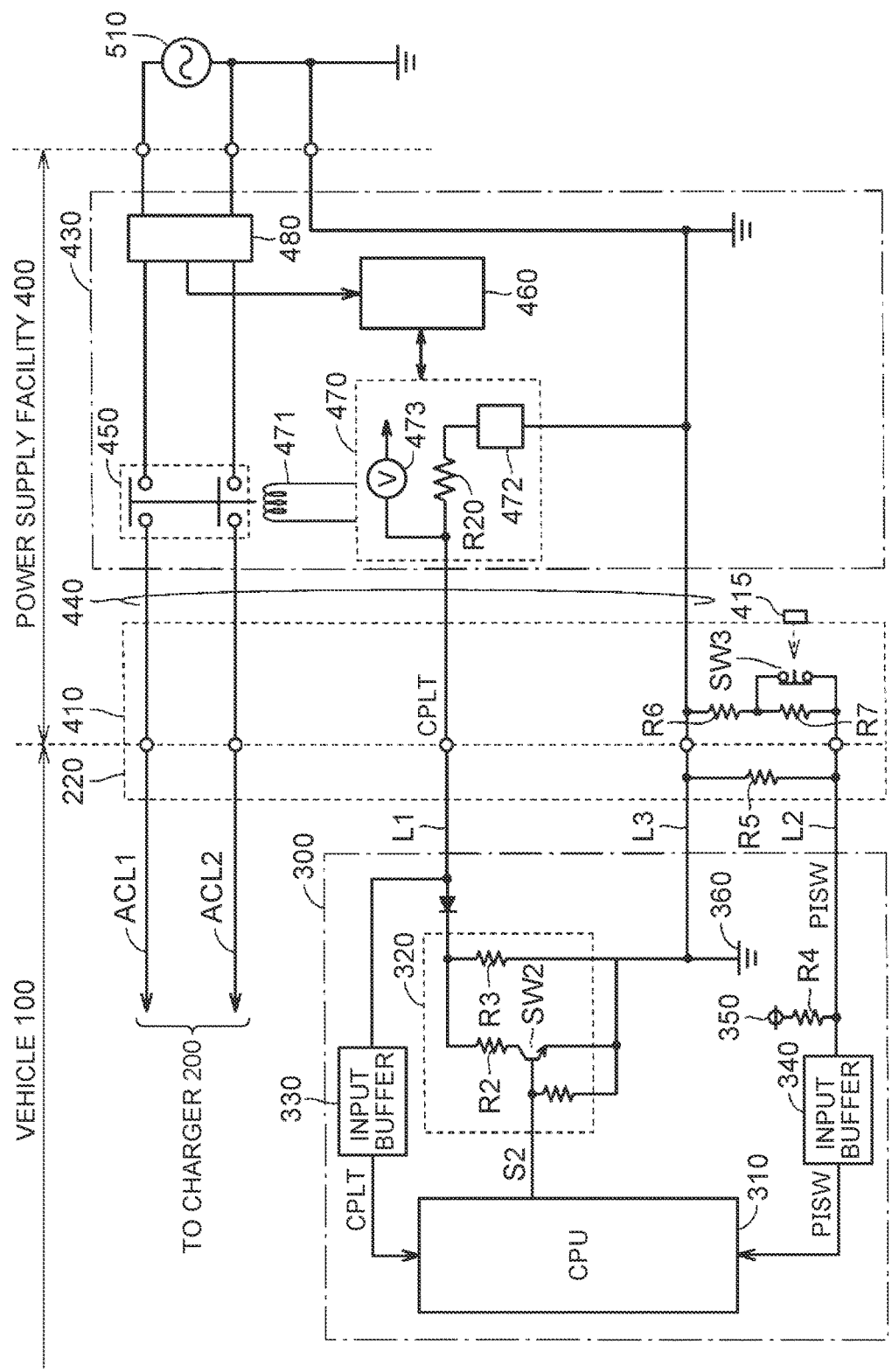
FIG. 2 is a view illustrating a circuit configuration of an ECU and an inlet of the vehicle, and the power supply facility illustrated in FIG. 1.

FIG. 2 is a view illustrating a circuit configuration of the ECU 300 and the inlet 220 of the vehicle 100, and the power supply facility 400 illustrated in FIG. 1. With reference to FIG. 2, the EVSE 430 of the power supply facility 400 further includes a controlling portion 460, an electromagnetic coil 471, and an electric leakage detector 480, in addition to the CCID 450 and the CPLT control circuit 470. The CPLT control circuit 470 includes an oscillation device 472, a resistor R20, and a voltage sensor 473.

The CCID 450 (hereinafter also referred to as the "CCID relay 450") is provided in a power supply path to the vehicle 100 and is controlled by the CPLT control circuit 470. When the CCID relay 450 is in an opened state, the power supply path is closed, and when the CCID relay 450 is in a closed state, an electric power can be supplied from the power supply 510 to the vehicle 100 through the charger cable 440.

The CPLT control circuit 470 outputs the pilot signal CPLT to the ECU 300 through the connector 410 and the inlet 220. As described above, the potential of the pilot signal CPLT is controlled by the ECU 300 of the vehicle 100 and is used as a signal to remotely control the CCID relay 450 from the ECU 300. The CPLT control circuit 470 controls the CCID relay 450 based on the potential of the pilot signal CPLT. Further, the pilot signal CPLT is also used as a signal to notify a rated current of the charger cable 440 from the CPLT control circuit 470 to the ECU 300.

The controlling portion 460 includes a CPU, a storage device, input/output ports, and the like (not shown), and is configured to perform input/output of signals of various sensors and the CPLT control circuit 470 and to control the operation of the CPLT control circuit 470.

When the connector 410 and the inlet 220 of the vehicle 100 are not connected to each other, the oscillation device 472 outputs a non-oscillatory pilot signal CPLT having a potential of V0. When the connector 410 is connected to the inlet 220, the potential of the pilot signal CPLT becomes V1, which is lower than V0, and when the power supply to the vehicle 100 is prepared in the EVSE 430, the oscillation device 472 oscillates the pilot signal CPLT at a prescribed frequency (e.g., 1 kHz) and duty cycle.

The duty cycle of the pilot signal CPLT is set so as to correspond to the rated current of the charger cable 440. The ECU 300 of the vehicle 100 can detect the rated current of the charger cable 440 based on the duty of the pilot signal CPLT received from the CPLT control circuit 470 through the signal wire L1.

When the potential of the pilot signal CPLT decreases to V2, which is further lower than V1, the CPLT control circuit 470 supplies a current to the electromagnetic coil 471. When the current is supplied from the CPLT control circuit 470 to the electromagnetic coil 471, the electromagnetic coil 471 generates an electromagnetic force, so that the CCID relay 450 enters the closed state. Hereby, a feeding voltage (a voltage from the power supply 510) is applied to the inlet 220 of the vehicle 100 through the charger cable 440.

The electric leakage detector 480 is provided in the power supply path to the vehicle 100 so as to detect whether or not electric leakage occurs in the power supply path. More specifically, the electric leakage detector 480 detects an equilibrium state between currents flowing in opposite directions through a pair of power lines constituting the power supply path, and when the equilibrium state breaks down, the electric leakage detector 480 detects an occurrence of the electric leakage. When the electric leakage is detected by the electric leakage detector 480, the power supply to the electromagnetic coil 471 is stopped, so that the CCID relay 450 enters the opened state.

Resistors R6, R7 and a switch SW3 are provided inside the connector 410. The resistors R6, R7 and the switch SW3 constitute a circuit for detecting a connection state between the connector 410 and the inlet 220 together with a power supply node 350 and a pull-up resistor R4 provided in the ECU 300 of the vehicle 100 and a resistor R5 provided in the inlet 220.

The resistors R6, R7 are serially-connected between the signal wire L2 and a ground wire L3. The switch SW3 is connected in parallel with the resistor R7. The switch SW3 works with a push button 415 provided in the connector 410. When the push button 415 is not pushed, the switch SW3 is in a closed state, and when the push button 415 is pushed, the switch SW3 enters an opened state. The resistor R5 is connected between the signal wire L2 and the ground wire L3 inside the inlet 220.

With such a circuit configuration, in a case where the connector 410 and the inlet 220 are not connected to each other, a signal having a potential (V3) determined by a voltage of the power supply node 350, the pull-up resistor R4, and the resistor R5 is generated in the signal wire L2 as the connector connect signal PISW. In a state where the connector 410 and the inlet 220 are connected to each other (the push button 415 is not operated), a signal having a potential (V4) determined by the voltage of the power supply node 350, the pull-up resistor R4, and the resistors R5, R6 is generated in the signal wire L2 as the connector connect signal PISW. When the push button 415 is operated in a state where the connector 410 and the inlet 220 are connected to each other, a signal having a potential (V5) determined by the voltage of the power supply node 350, the pull-up resistor R4, and the resistors R5 to R7 is generated in the signal wire L2 as the connector connect signal PISW. Accordingly, the ECU 300 can detect a connection state between the connector 410 and the inlet 220 by detecting the potential of the connector connect signal PISW.

The ECU 300 further includes a CPU 310, a resistance circuit 320, and input buffers 330, 340 in addition to the power supply node 350 and the pull-up resistor R4. The resistance circuit 320 includes pull-down resistors R2, R3 and a switch SW2. The pull-down resistor R2 and the switch SW2 are serially-connected between a vehicle earth 360 and the signal wire L1 through which the pilot signal CPLT is transmitted. The pull-down resistor R3 is connected between the signal wire L1 and the vehicle earth 360. The switch SW2 is turned on/off in response to a signal S2 from the CPU 310. The resistance circuit 320 is a circuit for controlling the potential of the pilot signal CPLT transmitted through the signal wire L1.

In a state where the resistance circuit 320 is electrically connected to the CPLT control circuit 470 via the signal wire L1, the inlet 220, and the connector 410, when the switch SW2 is turned off (a cut-off state), the potential of the pilot signal CPLT becomes a potential (V1) determined by the pull-down resistor R3. When the switch SW2 is turned off (a conductive state), the potential of the pilot signal CPLT becomes a potential (V2) determined by the pull-down resistors R2, R3.

The input buffer 330 is a circuit for taking the pilot signal CPLT into the CPU 310 from the signal wire L1. The input buffer 340 is a circuit for taking the connector connection signal PISW into the CPU 310 from the signal wire L2.

The CPU 310 receives the pilot signal CPLT from the input buffer 330 and receives the connector connect signal PISW from the input buffer 340. The CPU 310 detects a potential of the connector connect signal PISW, and detects a connection state between the connector 410 and the inlet 220 based on the potential of the connector connect signal PISW. Further, the CPU 310 detects a rated current of the charger cable 440 by detecting an oscillation state and a duty cycle of the pilot signal CPLT.

Further, in a case where the connector 410 and the inlet 220 are connected to each other, the CPU 310 requests power supply and stop thereof to the power supply facility 400 by controlling the signal S2 (the switch SW2) to control the potential of the pilot signal CPLT. More specifically, the CPU 310 requests the power supply to the power supply facility 400 by turning on the signal S2 to change the potential of the pilot signal CPLT from V1 to V2. Further, the CPU 310 requests the stop of power supply to the power supply facility 400 by turning off the signal S2 to change the potential of the pilot signal CPLT from V2 to V1.

When the CCID relay 450 enters the closed state in the EVSE 430 by the signal S2 being turned on, a feeding voltage is given to the charger 200 from the power supply facility 400 through the inlet 220. After a predetermined charging preparation process is finished, the CPU 310 outputs a control signal to the charger 200. Hereby, the charger 200 operates, so that external charging by the power supply 510 is executed.

As described above, the EVSE 430 provided in the power supply facility 400 satisfies the requirement specification of the standard determined by SAEJ1772, for example. Hereinafter, the power supply facility 400 including the EVSE 430 is also referred to as the "power supply facility 400 in conformity with the standard."

Figure 3:
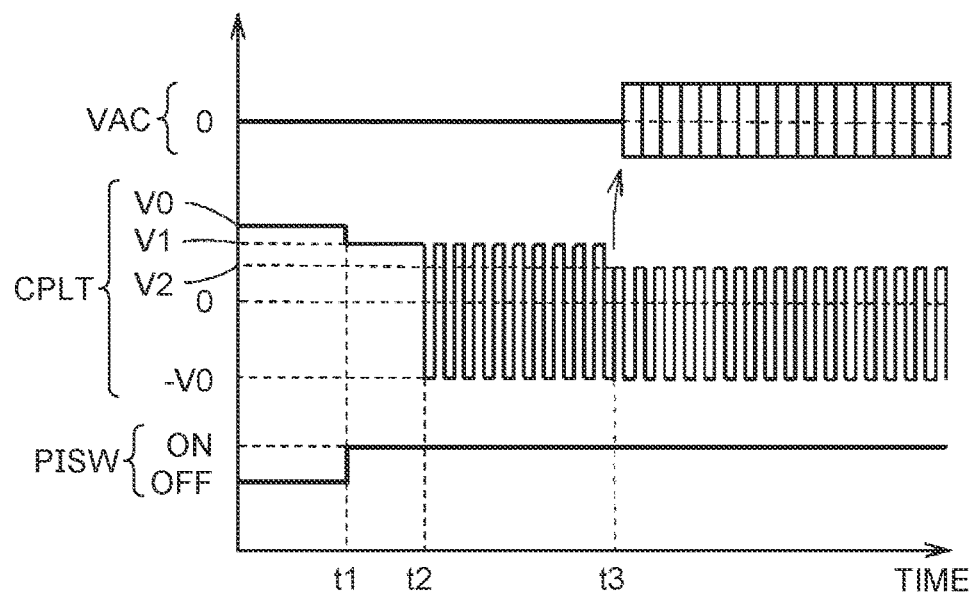
FIG. 3 is a time chart illustrating change states of a feeding voltage, a pilot signal, and a connector connect signal in a case where the vehicle is connected to a power supply facility in conformity with the standard.

FIG. 3 is a time chart illustrating change states of a feeding voltage VAC, a pilot signal CPLT, and a connector connect signal PISW in a case where the vehicle 100 is connected to the power supply facility 400 in conformity with the standard. In FIG. 3, a horizontal axis indicates time. The feeding voltage VAC is a voltage (an alternating current) to be supplied from the power supply facility 400, and more specifically, a voltage emerging in the connector 410 of the power supply facility 400. The potential of the pilot signal CPLT is a potential detected on the power supply facility 400 side, and more specifically, a detection value of the voltage sensor 473 of the CPLT control circuit 470. In terms of the connector connect signal PISW, "OFF" indicates that the inlet 220 and the connector 410 are not connected, and "ON" indicates that the inlet 220 and the connector 410 are connected.

Referring now to FIG. 2 as well as FIG. 3, the connector 410 is connected to the inlet 220 at a time tl. Before the time tl, the connector 410 and the inlet 220 are not connected to each other, so the potential of the pilot signal CPLT is V0 and the feeding voltage VAC is 0 V.

When the connector 410 is connected to the inlet 220 at the time tl, the potential of the pilot signal CPLT decreases to V1. Hereby, when the connection between the connector 410 and the inlet 220 is recognized in the EVSE 430 and power supply to the vehicle 100 is prepared at a time t2, the pilot signal CPLT oscillates.

After that, when a predetermined preparation process to execute external charging is finished in the vehicle 100, the CPU 310 changes the signal S2 from OFF to ON at a time t3. Hereby, the switch SW2 of the resistance circuit 320 is turned on, and the potential of the pilot signal CPLT becomes V2. In response to this, the CCID relay 450 enters the closed state in the power supply facility 400, so that the feeding voltage VAC is output from the power supply facility 400.

As such, in a case where the external charging is executed by the power supply facility 400 in conformity with the standard, the potential of the pilot signal CPLT is controlled in the vehicle 100 during the oscillation of the pilot signal CPLT (indicating that the power supply is ready in the power supply facility 400), so that the power supply is requested from the vehicle 100 to the power supply facility 400. In response to the power supply request from the vehicle 100, the CCID relay 450 is closed in the power supply facility 400, so that the output of the feeding voltage VAC from the power supply facility 400 to the vehicle 100 is started.

However, some power supply facilities start the power supply without being based on the power supply request from the vehicle because of the specification of the power supply facilities. In terms of such a power supply facility, external charging might be prohibited in the vehicle configured to receive power supply from the power supply facility based on a power supply request, because it is uncertain whether the power supply facility is normal (the specification of the power supply facility) or abnormal (e.g., the CCID relay is stuck closed), and therefore the power supply facility might be abnormal.

Figure 4:
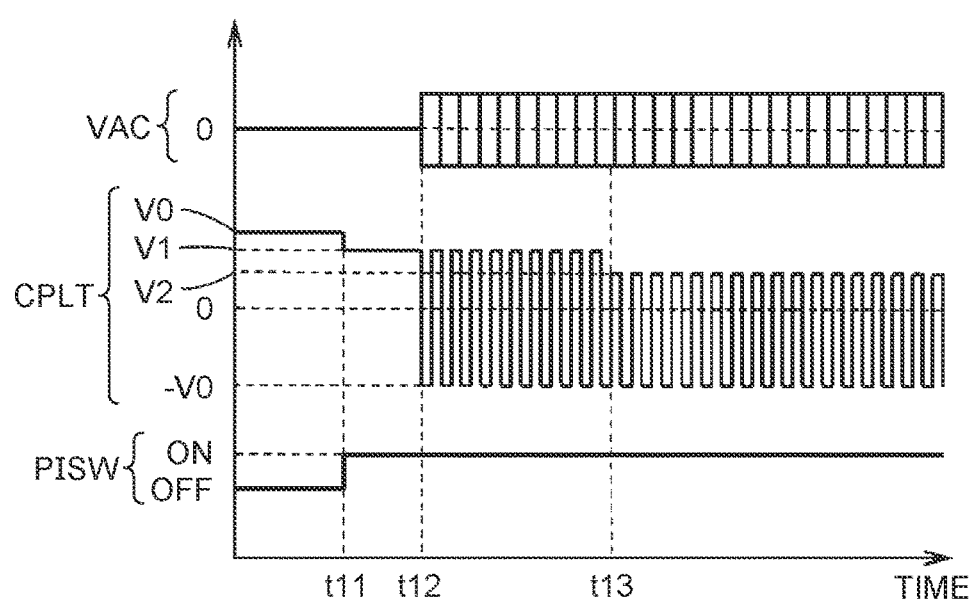
FIG. 4 is a view illustrating an exemplary operation of a power supply facility (A) that starts power supply without being based on a power supply request from the vehicle.

FIG. 4 is a view illustrating an exemplary operation of a power supply facility that starts power supply without being based on a power supply request from a vehicle. FIG. 4 corresponds to the time chart illustrated in FIG. 3. In the following description, the power supply facility exhibiting the operation illustrated in FIG. 4 is referred to as the "power supply facility (A)." Further, FIG. 4 illustrates an operation in a case where a vehicle that does not execute a special process illustrated in FIG. 6 (described later) is connected to the power supply facility (A).

With reference to FIG. 4, a connector of the power supply facility (A) is connected to an inlet of the vehicle at a time t11. Before the time t11, a potential of a pilot signal CPLT is V0 and a feeding voltage VAC is 0 V.

When the connector of the power supply facility (A) is connected to the inlet of the vehicle at the time t11, the potential of the pilot signal CPLT decreases to V1. Hereby, the connection between the connector and the inlet is recognized in the power supply facility (A), and when power supply to the vehicle is prepared at a time t12, the pilot signal CPLT oscillates.

When the power supply to the vehicle is prepared, the power supply facility (A) oscillates the pilot signal CPLT so as to notify the vehicle that the power supply is ready, and then outputs the feeding voltage VAC. That is, in the power supply facility (A), without waiting for a decrease of the potential of the pilot signal CPLT to V2 at a time t13, that is, without receiving a power supply request from the vehicle, the feeding voltage VAC is output from the power supply facility to the vehicle at the time t12 at which the oscillation of the pilot signal CPLT is started.

Figure 5:
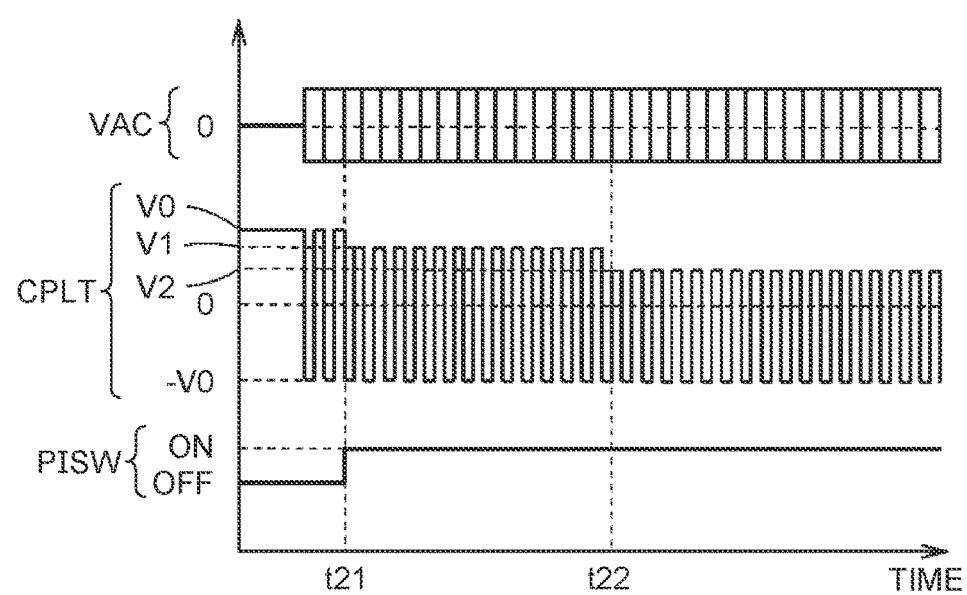
FIG. 5 is a view illustrating an exemplary operation of another power supply facility (B) that starts power supply without being based on a power supply request from the vehicle.

Further, FIG. 5 is a view illustrating an exemplary operation of another power supply facility that starts power supply without a power supply request from a vehicle. FIG. 5 also corresponds to the time chart illustrated in FIG. 3. In the following description, the power supply facility exhibiting the operation illustrated in FIG. 5 is referred to as the "power supply facility (B)." Further, FIG. 5 also illustrates an operation in a case where a vehicle that does not execute the special process illustrated in FIG. 6 (described later) is connected to the power supply facility (B).

With reference to FIG. 5, a connector of the power supply facility (B) is connected to an inlet of the vehicle at a time t21. The power supply facility (B) oscillates a pilot signal CPLT and outputs a feeding voltage VAC before the connector is connected to the inlet, e.g., at a timing when authentication to execute external charging is performed. That is, also in the power supply facility (B), without waiting for a decrease of the potential of the pilot signal CPLT to V2 at a time t22, that is, without receiving a power supply request from the vehicle, the feeding voltage VAC is output from the power supply facility.

The power supply facilities (A), (B) are configured such that the feeding voltage VAC is output from the power supply facilities without receiving a power supply request from a vehicle, and in a vehicle configured to receive power supply from a power supply facility based on a power supply request, external charging might be prohibited. That is, in a case of a power supply facility like the power supply facilities (A), (B), it is uncertain, for the vehicle that receives a feeding voltage VAC from the power supply facility without requesting power supply to the power supply facility, whether the power supply facility is normal (the specification of the power supply facility) or abnormal (e.g., the CCID relay is stuck closed), and the power supply facility might be abnormal, so the external charging might be prohibited.

In view of this, in a case where the vehicle 100 to which the charging apparatus of Embodiment 1 is applied detects that the output of the feeding voltage VAC is started without requesting power supply to the power supply facility, the potential of the pilot signal CPLT is controlled separately from a sequence in accordance with the standard, so that a power supply stop is requested to the power supply facility. When the power supply from the power supply facility is stopped in response to the request of the power supply stop, it is determined that the CCID relay of the power supply facility operates normally, and external charging is permitted by the vehicle 100. As such, in a case where the output start of the feeding voltage VAC is detected without requesting the power supply to the power supply facility, when it is detected that the power supply is not performed from the power supply facility with the connector of the power supply facility being connected to the inlet 220, it is determined that the power supply facility operates normally in such a manner that the power supply and the stop thereof are performable, so that the external charging is permitted. Accordingly, with Embodiment 1, it is possible to execute the external charging from the power supply facility that starts power supply without being based on the power supply request from the vehicle 100.

Figure 6:
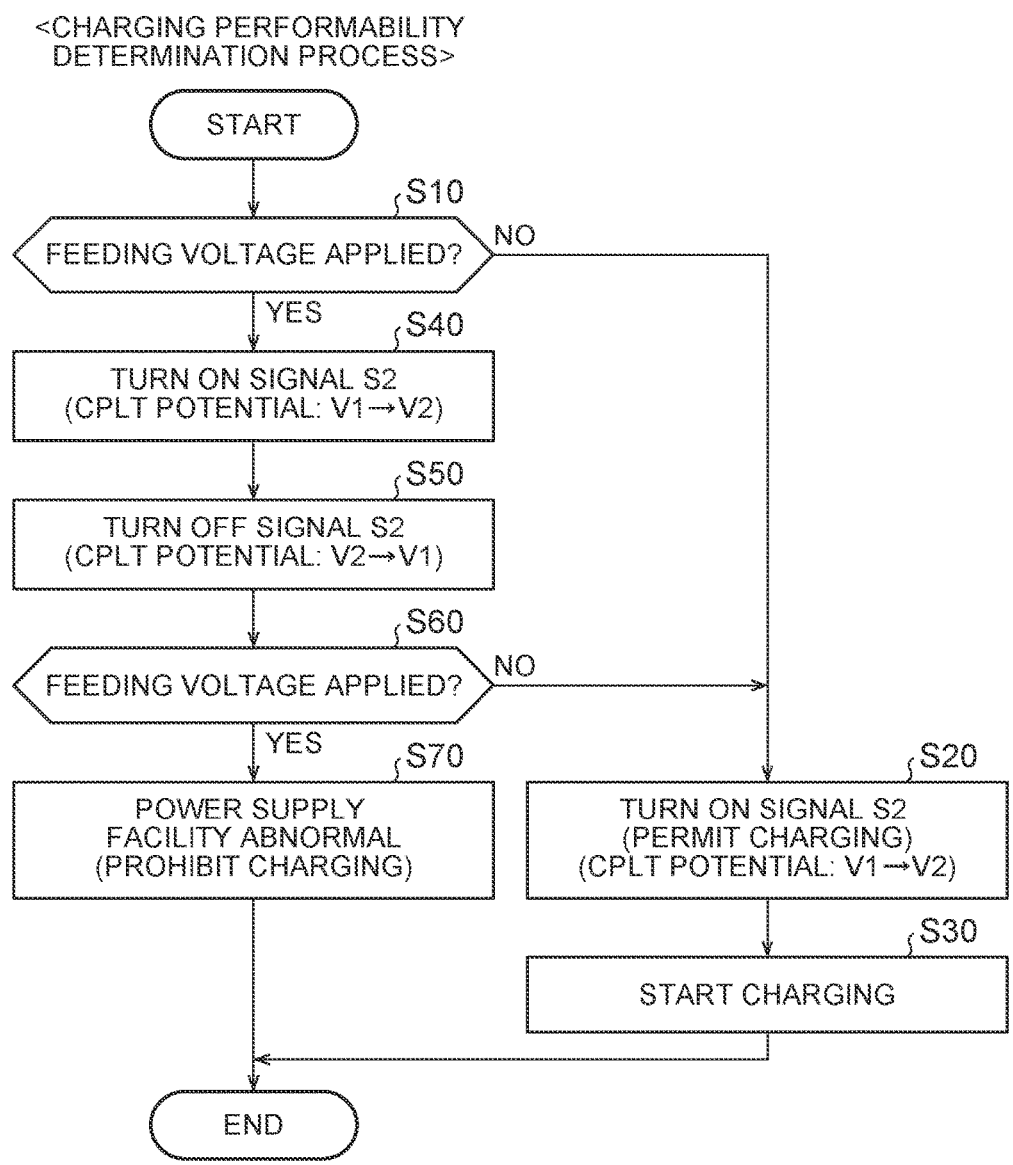
FIG. 6 is a flowchart to describe a procedure of an external charging performability determination process executed by a CPU of the ECU.

FIG. 6 is a flowchart to describe a procedure of an external charging performability determination process executed by the CPU 310 of the ECU 300. Note that the process illustrated in the flowchart is started when the CPU 310 detects an oscillation start of the pilot signal CPLT (or an input start in a case where the pilot signal CPLT oscillates at the time of the input start thereof).

With reference to FIG. 6, when the oscillation start of the pilot signal CPLT is detected, the CPU 310 determines whether the feeding voltage VAC is applied from the power supply facility or not (step S10). Although not illustrated herein especially, a voltage sensor for detecting a voltage between the pair of power lines ACL1, ACL2 (FIG. 1, FIG. 2) provided between the charger 200 and the inlet 220 is provided, for example, and it is determined whether the feeding voltage VAC is applied or not based on a detection value of the voltage sensor.

When it is determined that the feeding voltage VAC is not applied in step S10 (NO in step S10), the CPU 310 turns on the signal S2 and permits execution of the external charging (step S20) after a predetermined preparation process to execute external charging is finished. That is, the CPU 310 decreases the potential of the pilot signal CPLT from V1 to V2, so as to request power supply to the power supply facility and to permit execution of external charging. When the potential of the pilot signal CPLT decreases from V1 to V2, the CCID relay is closed in the power supply facility, so that the feeding voltage VAC is applied to the vehicle 100 from the power supply facility. After that, the CPU 310 closes the charging relay 210 and starts external charging by driving the charger 200 (step S30).

Note that, in a case where the vehicle 100 receives power supply from the power supply facility 400 in conformity with the standard, the process proceeds in order of steps S10, S20, S30, so that the external charging is permitted.

In step S10, when it is determined that the feeding voltage VAC is applied from the power supply facility (YES in step S10) though the signal S2 is not turned on, that is, though power supply is not requested to the power supply facility, the CPU 310 turns on the signal S2 once (step S40), and then, turns off the signal S2 (step S50). That is, the CPU 310 once decreases the potential of the pilot signal CPLT from V1 to V2, and then changes the potential of the pilot signal CPLT from V2 to V1, so as to request a power supply stop to the power supply facility.

After that, the CPU 310 determines again whether the feeding voltage VAC is applied from the power supply facility or not (step S60). When the feeding voltage VAC is not applied (NO in step S60), it is determined that the CCID relay is normally turned off in the power supply facility in response to the power supply stop requested in step S50, and then, the process proceeds to step S20. That is, the signal S2 is turned on, and the execution of external charging is permitted.

In the meantime, in step S60, when it is determined that the feeding voltage VAC is applied (YES in step S60), the CPU 310 determines that the power supply facility is abnormal, and prohibits the external charging (step S70). In this case, the feeding voltage VAC is kept applied despite the request of the power supply stop to the power supply facility in step S50, so it is determined that the power supply facility has an abnormality such as stuck closing of the CCID relay, and the external charging is prohibited. More specifically, the turn-on of the charging relay 210 (FIG. 1) and the operation of the charger 200 (FIG. 1) are prohibited.

Figure 7:
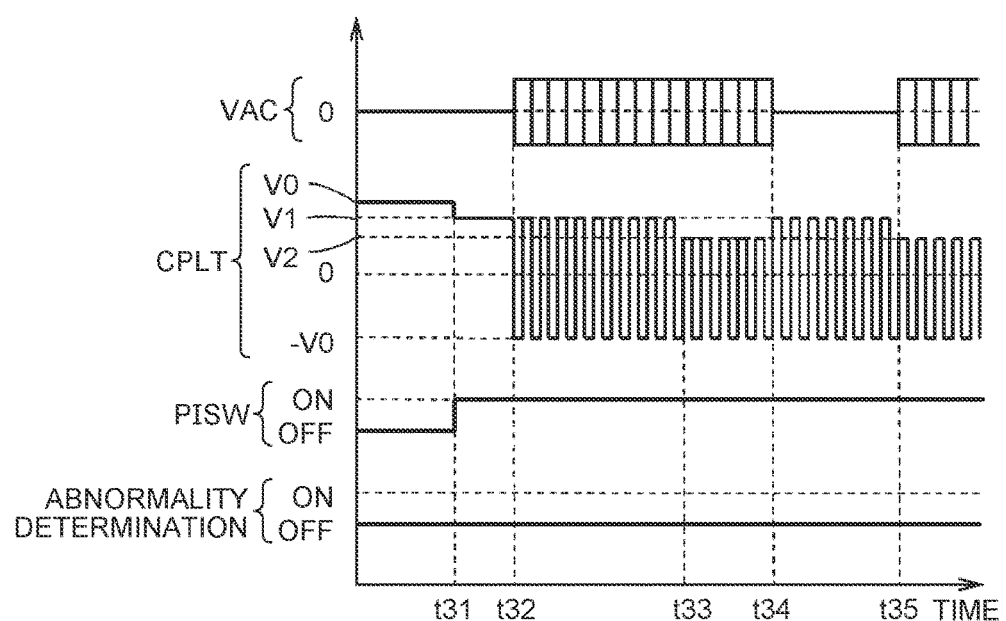
FIG. 7 is a first time chart illustrating change states of a feeding voltage and various signals in a case where a vehicle provided with a charging apparatus of Embodiment 1 is connected to the power supply facility (A) described in FIG. 4 in terms of the operation.
Figure 8:
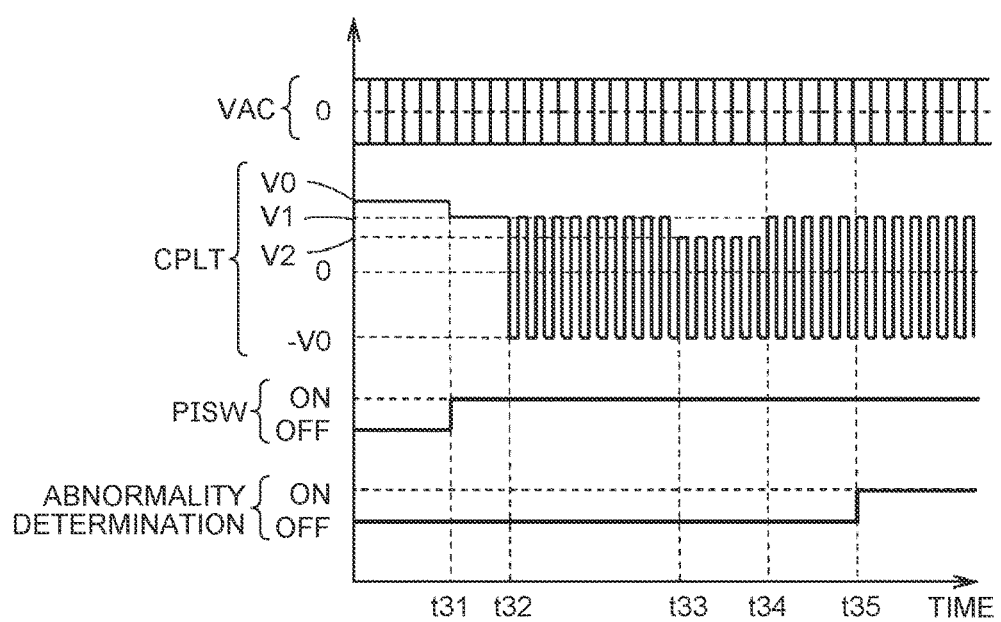
FIG. 8 is a second time chart illustrating change states of a feeding voltage and various signals in a case where the vehicle provided with the charging apparatus of Embodiment 1 is connected to the power supply facility (A) described in FIG. 4 in terms of the operation.

FIGS. 7, 8 are time charts illustrating change states of the feeding voltage VAC and various signals in a case where the vehicle 100 provided with the charging apparatus of Embodiment 1 is connected to the power supply facility (A) described in FIG. 4 in terms of the operation. FIG. 7 illustrates a time chart in a case where it is determined that the power supply facility (A) is normal, and FIG. 8 illustrates a time chart in a case where it is determined that the power supply facility (A) is abnormal.

Referring now to FIG. 7, as has been described in FIG. 4, in the power supply facility (A), without waiting for the decrease of the potential of the pilot signal CPLT to V2, that is, without receiving a power supply request from the vehicle 100, the feeding voltage VAC is output from the power supply facility (A) to the vehicle 100 at a time t32 at which the oscillation of the pilot signal CPLT is started.

In the vehicle 100 in Embodiment 1, in a case where the output of the feeding voltage VAC from the power supply facility (A) is detected before the power supply is requested to the power supply facility (A), the potential of the pilot signal CPLT is once decreased from V1 to V2 (at a time t33), and after that, the potential of the pilot signal CPLT is changed from V2 to V1, so that a power supply stop is requested to the power supply facility (A) (at a time t34).

As illustrated in FIG. 7, when the output of the feeding voltage VAC is stopped in accordance with the change of the potential of the pilot signal CPLT from V2 to V1 at the time t34, it is determined that the power supply facility (A) operates normally in response to the potential control of the pilot signal CPLT, so that the external charging by the power supply facility (A) is permitted. That is, the potential of the pilot signal CPLT is controlled to V2 by the CPU 310 at a time t35, and the CCID relay is closed in the power supply facility (A), so that the feeding voltage VAC is output from the power supply facility (A) to the vehicle 100.

In the meantime, referring now to FIG. 8, in a case where the output of the feeding voltage VAC from the power supply facility (A) does not stop at the time t34 even when the potential of the pilot signal CPLT is changed from V2 to V1, it is determined that the power supply facility (A) is abnormal (stuck closing of the CCID relay) at the time t35. In this case, the external charging is prohibited, and after that, a user takes a measurement such as removal of the connector from the inlet 220 (not shown).

Figure 9:
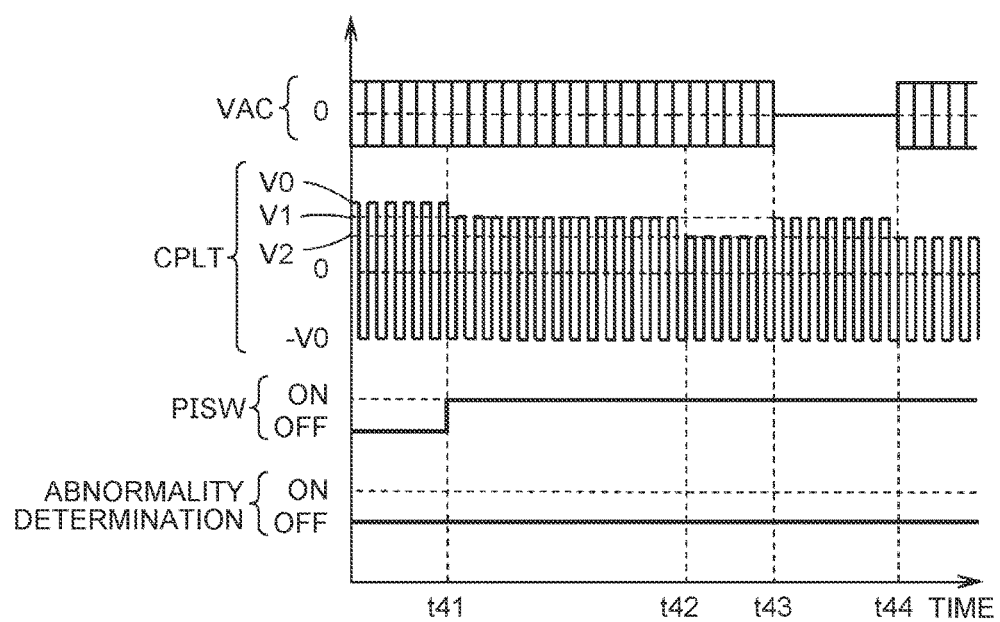
FIG. 9 is a first time chart illustrating change states of a feeding voltage and various signals in a case where the vehicle provided with the charging apparatus of Embodiment 1 is connected to the power supply facility (B) described in FIG. 5 in terms of the operation.
Figure 10:
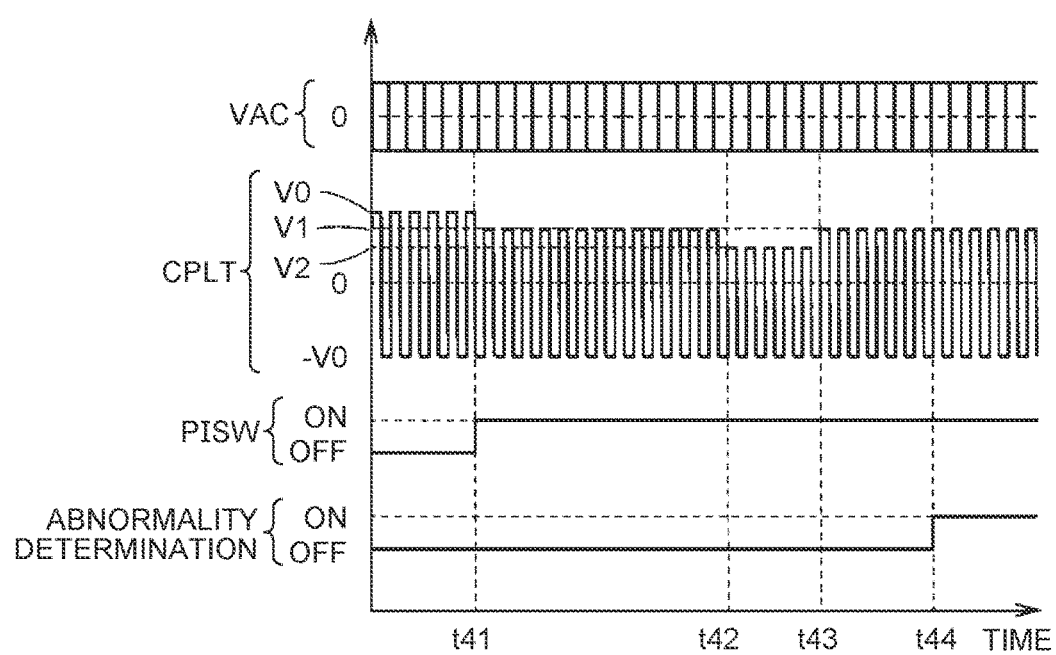
FIG. 10 is a second time chart illustrating change states of a feeding voltage and various signals in a case where the vehicle provided with the charging apparatus of Embodiment 1 is connected to the power supply facility (B) described in FIG. 5 in terms of the operation.

FIGS. 9, 10 are time charts illustrating change states of the feeding voltage

VAC and various signals in a case where the vehicle 100 provided with the charging apparatus of Embodiment 1 is connected to the power supply facility (B) described in FIG. 5 in terms of the operation. FIG. 9 illustrates a time chart in a case where it is determined that the power supply facility (B) is normal, and FIG. 10 illustrates a time chart in a case where it is determined that the power supply facility (B) is abnormal.

Referring now to FIG. 9, as has been described in FIG. 5, even in a case of the power supply facility (B), without waiting for the decrease of the potential of the pilot signal CPLT to V2, that is, without receiving the power supply request from the vehicle 100, the pilot signal CPLT oscillates and the feeding voltage VAC is output from the power supply facility (B) before a time t41 at which the connector is connected to the inlet 220.

When the connector of the power supply facility (B) is connected to the inlet 220 at the time t41, the output of the feeding voltage VAC is detected in the vehicle 100. That is, the vehicle 100 detects the output of the feeding voltage VAC from the power supply facility (B) before power supply is requested to the power supply facility (B). The time after the time t41 is the same as that of FIG. 7 after the time t32, and when the output of the feeding voltage VAC is stopped in accordance with the change of the potential of the pilot signal CPLT from V2 to V1 at a time t43, it is determined that the power supply facility (B) operates normally and external charging by the power supply facility (B) is permitted.

In the meantime, referring now to FIG. 10, in a case where the output of the feeding voltage VAC from the power supply facility (B) does not stop at the time t43 even when the potential of the pilot signal CPLT is changed from V2 to V1, it is determined that the power supply facility (B) is abnormal (stuck closing of the CCID relay) at a time t44. In this case, the external charging is prohibited, and after that, a user takes a measurement such as removal of the connector from the inlet 220 (not shown).

As described above, in Embodiment 1, in a case where it is detected that the output of the feeding voltage VAC is started without requesting the power supply to the power supply facility, the potential of the pilot signal CPLT is controlled, so that the power supply stop is requested to the power supply facility. When the power supply from the power supply facility is stopped in response to the request of the power supply stop, it is determined that the power supply facility operates normally, and the external charging is permitted by the vehicle 100. Accordingly, with Embodiment 1, it is possible to execute the external charging from the power supply facilities (A), (B) that start power supply without being based on the power supply request from the vehicle 100.

Further, with Embodiment 1, it is possible to determine whether the power supply facility operates normally in conjunction with the control of the potential of the pilot signal CPLT by the ECU 300 of the vehicle 100.

[Embodiement 2] In Embodiment 1, in a case where the feeding voltage VAC from the power supply facility is detected without requesting power supply to the power supply facility, the potential of the pilot signal CPLT is controlled by controlling the signal S2 by the CPU 310. When the output of the feeding voltage VAC from the power supply facility stops in response to the control on the potential of the pilot signal CPLT, it is determined that the power supply facility is normal, and the external charging is permitted by the vehicle 100.

Embodiment 2 exemplifies a method in which, in a case where a feeding voltage VAC from a power supply facility is detected without requesting power supply to the power supply facility, it is determined whether external charging is performable or not, without controlling a signal S2. More specifically, when the feeding voltage VAC from the power supply facility is not detected in a state where a connector of the power supply facility is connected to an inlet of a vehicle, a no-voltage history flag (described later) is turned on. In a case where the feeding voltage VAC is detected without requesting power supply to the power supply facility, when the no-voltage history flag is turned on, it is deteiinined that the power supply facility operates normally in such a manner that the output of the feeding voltage VAC and its stop are performable, so that external charging is permitted.

The no-voltage history flag is a flag indicating that preparation of power supply is not completed in the power supply facility and the feeding voltage VAC is not output from the power supply facility. In the power supply facility, when the power supply to the vehicle is prepared, a pilot signal CPLT oscillates. In the power supply facility that outputs the feeding voltage VAC without receiving a power supply request from the vehicle, when the power supply to the vehicle is prepared, the pilot signal CPLT oscillates and the feeding voltage VAC is output without waiting for a power supply request from the vehicle after that. Meanwhile, in a case where the feeding voltage VAC is output without waiting for the power supply request from the vehicle, the power supply facility might have an abnormality such as stuck closing of a CCID relay.

In view of this, in a case where the output of the feeding voltage VAC is detected without the power supply request from the vehicle, when it is detected that the feeding voltage VAC has not been output before that, the no-voltage history flag is turned on. The no-voltage history flag is referred to, and when it is detected that the feeding voltage VAC is output without the power supply request from the vehicle, it is possible to determine whether the power supply facility is abnormal and the feeding voltage VAC is always output or the power supply facility operates normally in accordance with its specification. In a case where it is detected that the feeding voltage VAC is output without the power supply request from the vehicle, when the no-voltage history flag is turned on, it is determined that the power supply facility operates normally, and external charging is permitted.

Note that, in Embodiement 2, it is difficult to determine whether the external charging is performable or not with respect to the power supply facility (B) (FIG. 5) in which the pilot signal CPLT oscillates and the feeding voltage VAC is output before the connector of the power supply facility is connected to the inlet of the vehicle. In Embodiement 2, it is possible to determine whether the external charging is performable or not with respect to the power supply facility (A) (FIG. 4) in which the pilot signal CPLT oscillates and the feeding voltage VAC is output after the connector of the power supply facility is connected to the inlet.

A whole configuration of the vehicle to which a charging apparatus of Embodiement 2 is applied is the same as the vehicle 100 illustrated in FIG. 1.

Figure 11:
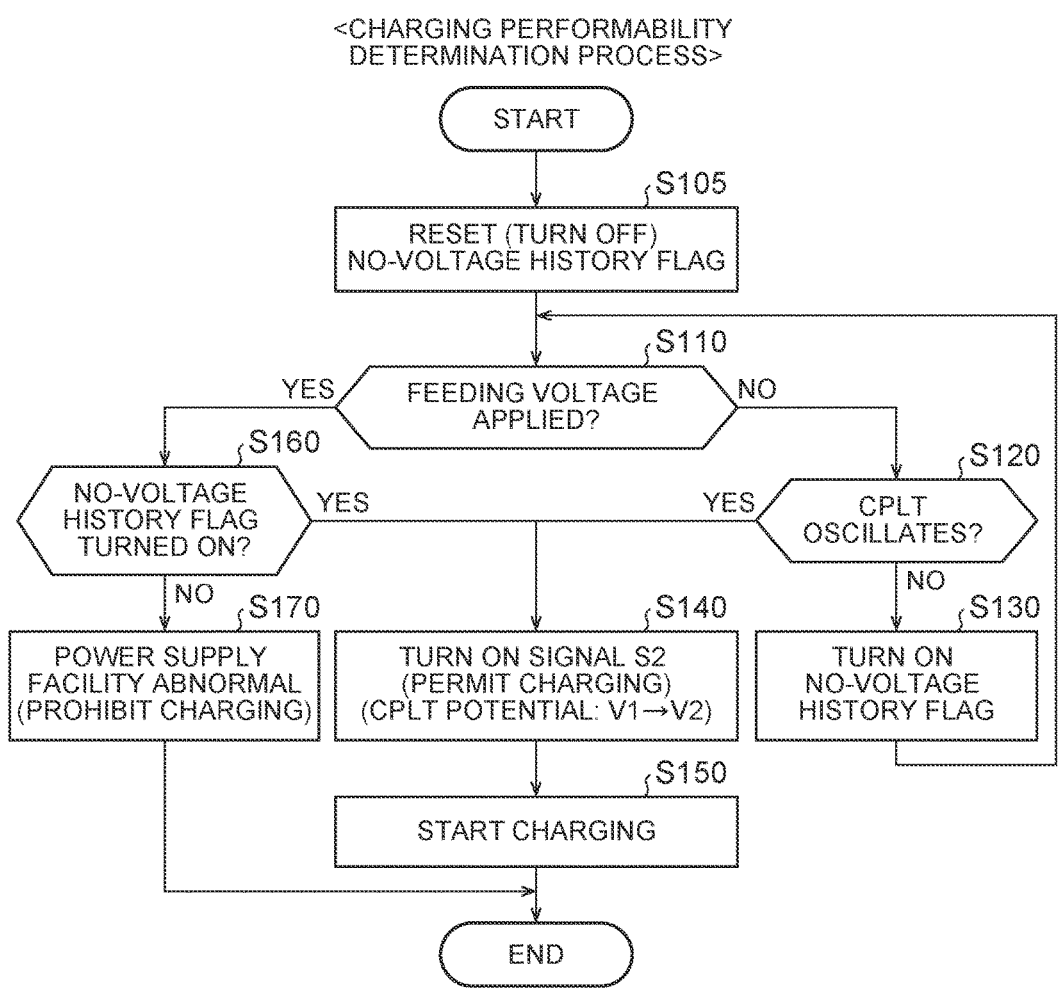
FIG. 11 is a flowchart to describe a procedure of an external charging performability determination process executed by a CPU of an ECU in Embodiement 2.

FIG. 11 is a flowchart to describe a procedure of an external charging performability determination process executed by a CPU 310 of an ECU 300 in Embodiement 2. Note that the process illustrated in this flowchart is started when the CPU 310 detects an input start of the pilot signal CPLT.

With reference to FIG. 11, when the input start of the pilot signal CPLT is detected, the CPU 310 resets (turns off) the no-voltage history flag (step S105). The CPU 310 determines whether the feeding voltage VAC is applied from the power supply facility or not (step S110). When the feeding voltage VAC is not applied (NO in step S110), the CPU 310 determines whether the pilot signal CPLT oscillates or not (step S120). When the pilot signal CPLT does not oscillate (NO in step S120), the CPU 310 turns on the no-voltage history flag (step S130), and returns the process to step S110.

When it is determined that the pilot signal CPLT oscillates in step S120 (YES in step S120), the CPU 310 turns on the signal S2 and permits execution of external charging after a predetermined preparation process to execute the external charging is finished (step S140). That is, the CPU 310 decreases the potential of the pilot signal CPLT from V1 to V2, so as to request the power supply to the power supply facility and to permit execution of the external charging. When the potential of the pilot signal CPLT decreases to V2, the CCID relay is closed in the power supply facility, so that the feeding voltage VAC is applied to the vehicle 100 from the power supply facility. After that, the CPU 310 closes a charging relay 210 and starts the external charging by driving a charger 200 (step S150).

Note that, in a case where the vehicle 100 receives the power supply from the power supply facility 400 in conformity with the standard, the process proceeds in order of steps S110, S120, S140, so that the external charging is permitted.

In step S110, when it is determined that the feeding voltage VAC is applied (YES in step S110), the CPU 310 determines whether the no-voltage history flag is turned on or not (step S160). In a case where the no-voltage history flag is turned off (NO in step S160), it is difficult to detect a state where the power supply is not performed from the power supply facility with the connector of the power supply facility being connected to the inlet 220. Accordingly, the CPU 310 determines that the power supply facility is abnormal (e.g., the CCID relay is stuck closed) and prohibits execution of the external charging (step S170).

In the meantime, when it is determined that the no-voltage history flag is turned on in step S160 (YES in step S160), it is possible to detect the state where the power supply is not performed from the power supply facility with the connector of the power supply facility being connected to the inlet 220, so that it is determined that the power supply facility is normal (the CCID relay operates normally). After that, the CPU 310 shifts the process to step S140, in which the signal S2 is turned on and the external charging is permitted.

Figure 12:
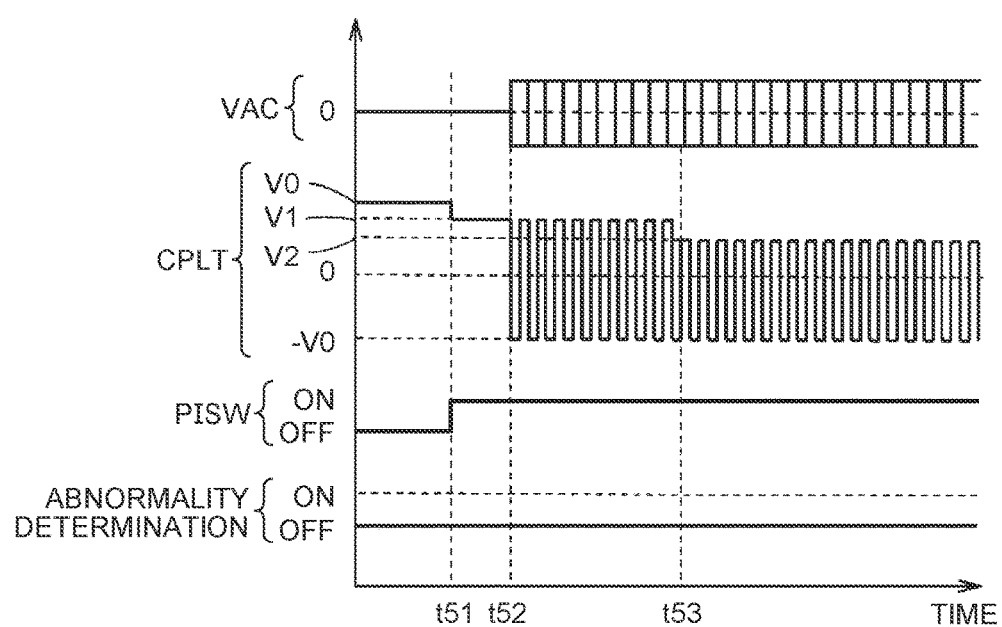
FIG. 12 is a first time chart illustrating change states of a feeding voltage and various signals in a case where a vehicle provided with a charging apparatus of Embodiement 2 is connected to the power supply facility (A) described in FIG. 4 in terms of the operation.
Figure 13:
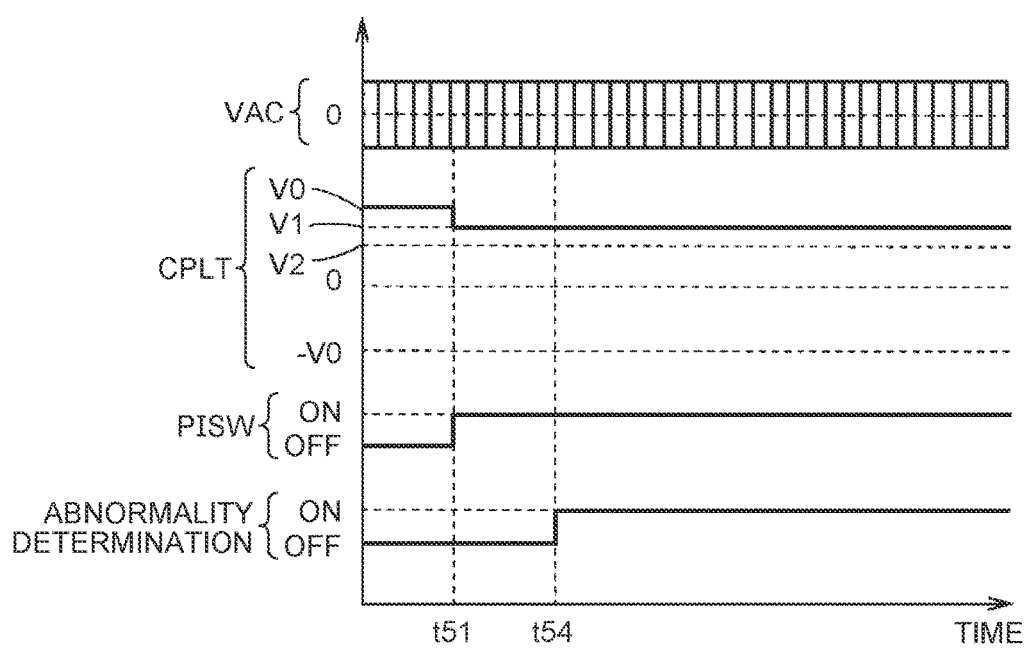
FIG. 13 is a second time chart illustrating change states of a feeding voltage and various signals in a case where the vehicle provided with the charging apparatus of Embodiement 2 is connected to the power supply facility (A) described in FIG. 4 in terms of the operation.

FIGS. 12, 13 are time charts illustrating change states of the feeding voltage VAC and various signals in a case where the vehicle 100 provided with the charging apparatus of Embodiement 2 is connected to the power supply facility (A) described in FIG. 4. FIG. 12 illustrates a time chart in a case where it is determined that the power supply facility (A) is normal, and FIG. 13 illustrates a time chart in a case where it is determined that the power supply facility (A) is abnormal.

Referring now to FIG. 12, when the connector of the power supply facility (A) is connected to the inlet 220 of the vehicle 100 at a time t51, the potential of the pilot signal CPLT decreases to V1. At this point of time, power supply to the vehicle 100 is not ready in the power supply facility (A), the pilot signal CPLT does not oscillate, and the feeding voltage VAC is 0.

After that, when the power supply to the vehicle 100 is ready at a time t52, the pilot signal CPLT oscillates, and the feeding voltage VAC is applied. That is, as described above, in the power supply facility (A), without waiting for the decrease of the potential of the pilot signal CPLT to V2, that is, without receiving a power supply request from the vehicle 100, the feeding voltage VAC is output from the power supply facility (A) to the vehicle 100 at the time t52 at which the oscillation of the pilot signal CPLT is started.

Here, the pilot signal CPLT does not oscillate and the feeding voltage VAC is 0 between the time t51 and the time t52. Then, the pilot signal CPLT oscillates and the feeding voltage VAC is output at the time t52. As such, in a case where the output of the feeding voltage VAC is detected at the time t52 without receiving the power supply request from the vehicle 100, when it is detected that the feeding voltage VAC is not output between the times t51 to t52 by referring to the no-voltage history flag, it is determined that the power supply facility (A) is normal (the CCID relay operates normally), and the external charging by the power supply facility (A) is permitted.

In the meantime, with reference to FIG. 13, the following assumes a case where the power supply facility (A) has an abnormality (the CCID relay is stuck closed) and the feeding voltage VAC is generated before the connector of the power supply facility (A) is connected to the inlet 220 at the time t51. When the connector is connected to the inlet 220 at the time t51, the feeding voltage VAC is detected promptly. In this case, a state where the feeding voltage VAC is not output is not detected as illustrated in FIG. 12, so it is determined that the power supply facility (A) is abnormal (the CCID relay is stuck closed) at the time t54.

As described above, in Embodiement 2, the no-voltage history flag is provided. In a case where the feeding voltage VAC from the power supply facility is detected without requesting power supply to the power supply facility, when the no-voltage history flag is turned on, it is determined that the power supply facility is normal and the external charging is permitted. Accordingly, with Embodiement 2, it is possible to determine whether the power supply facility operates normally or not without specially controlling the potential of the pilot signal CPLT by the ECU 300 of the vehicle 100.

It should be considered that the embodiments described herein are just examples in all respects and are not limitative. A scope of the present disclosure is shown by claims, not by the descriptions of the above embodiments, and is intended to include every modification made within the meaning and scope equivalent to claims.

What is claimed is:

1. A charging apparatus for charging a power storage device provided in a vehicle upon receipt of an electric power supplied through a charger cable from a power supply facility provided outside the vehicle, the charging apparatus comprising:
   an inlet configured to be connectable to a connector provided in the charger cable; and
   an electronic control unit configured to control a potential of a pilot signal received through the charger cable from the power supply facility when the connector is connected to the inlet, so as to request power supply to the power supply facility and to permit charging of the power storage device, wherein
   when the electronic control unit detects an output start of a feeding voltage of the electric power from the power supply facility without requesting the power supply to the power supply facility and the electronic control unit detects that the feeding voltage of the electric power from the power supply facility is not output in a state where the connector is connected to the inlet, the electronic control unit is configured to permit the charging of the power storage device.

2. The charging apparatus according to claim 1, wherein:
   when the electronic control unit detects the output start of the feeding voltage of the electric power from the power supply facility without requesting the power supply to the power supply facility and the electronic control unit does not detect that the feeding voltage of the electric power is not output from the power supply facility in the state where the connector is connected to the inlet, the electronic control unit is configured to prohibit the charging of the power storage device.

3. The charging apparatus according to claim 1, wherein
   when the electronic control unit detects the output start of the feeding voltage of the electric power from the power supply facility without requesting the power supply to the power supply facility, the electronic control unit is configured to control the potential of the pilot signal such that a power supply stop is requested to the power supply facility, and
   when the output of the feeding voltage of the electric power from the power supply facility is stopped in response to the request of the power supply stop, the electronic control unit is configured to permit the charging of the power storage device.

4. The charging apparatus according to claim 1, wherein
   when the feeding voltage of the electric power is not output from the power supply facility in the state where the connector is connected to the inlet, the electronic control unit is configured to leave a history indicating that the feeding voltage of the electric power is not output from the power supply facility, and
   when the electronic control unit detects that the output start of the feeding voltage of the electric power from the power supply facility without requesting the power supply to the power supply facility and the history exists, the electronic control unit is configured to permit the charging of the power storage device.

5. A control method for a charging apparatus for charging a power storage device provided in a vehicle upon receipt of an electric power supplied through a charger cable from a power supply facility provided outside the vehicle, the charging apparatus including an inlet configured to be connectable to a connector provided in the charger cable, and an electronic control unit, the control method comprising:
- requesting power supply to the power supply facility and permitting charging of the power storage device by the electronic control unit by controlling a potential of a pilot signal received through the charger cable from the power supply facility when the connector is connected to the inlet; and
- permitting the charging of the power storage device by the electronic control unit when an output start of a feeding voltage of the electric power from the power supply facility is detected without requesting the power supply to the power supply facility and the electronic control unit detects that the feeding voltage of the electric power from the power supply facility is not output in a state where the connector is connected to the inlet.

* * * * *

UNITED STATES PATENT AND TRADEMARK OFFICE
CERTIFICATE OF CORRECTION

PATENT NO. : 10,308,126 B2
APPLICATION NO. : 15/677094
DATED : June 4, 2019
INVENTOR(S) : Tomokazu Masuda Page 1 of 1

It is certified that error appears in the above-identified patent and that said Letters Patent is hereby corrected as shown below:

In the Specification

In Column 4, Line 18, delete "Embodiement" and insert --Embodiment--, therefor.

In Column 4, Line 21, delete "Embodiement" and insert --Embodiment--, therefor.

In Column 4, Line 26 - 27, delete "Embodiement" and insert --Embodiment--, therefor.

In Column 13, Line 25, delete "Embodiement" and insert --Embodiment--, therefor.

In Column 13, Line 35, delete "Embodiement" and insert --Embodiment--, therefor.

In Column 13, Line 47, delete "deteiinined" and insert --determined--, therefor.

In Column 14, Line 14, delete "Embodiement" and insert --Embodiment--, therefor.

In Column 14, Line 19, delete "Embodiement" and insert --Embodiment--, therefor.

In Column 14, Line 26, delete "Embodiement" and insert --Embodiment--, therefor.

In Column 14, Line 30, delete "Embodiement" and insert --Embodiment--, therefor.

In Column 15, Line 18, delete "Embodiement" and insert --Embodiment--, therefor.

In Column 15, Line 63, delete "Embodiement" and insert --Embodiment--, therefor.

In Column 16, Line 02, delete "Embodiement" and insert --Embodiment--, therefor.

Signed and Sealed this
Sixteenth Day of July, 2019

Andrei Iancu
*Director of the United States Patent and Trademark Office*